United States Patent
Kumar et al.

(10) Patent No.: US 11,379,110 B1
(45) Date of Patent: Jul. 5, 2022

(54) ARTIFICIAL INTELLIGENCE-BASED OPERATING SYSTEM FOR DRAG AND DROP OPERATIONS

(71) Applicant: International Business Machines Corporation, Armonk, NY (US)

(72) Inventors: Kapish Kumar, Bengaluru (IN); Praveen R. Sogalad, Bengaluru (IN); Prabhu S. Padashetty, Bengaluru (IN); Shobhit Shukla, Lucknow (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/301,688

(22) Filed: Apr. 12, 2021

(51) Int. Cl.
| | |
|---|---|
| *G06F 3/0486* | (2013.01) |
| *G06F 16/955* | (2019.01) |
| *G06F 16/16* | (2019.01) |
| *G06F 3/04845* | (2022.01) |

(52) U.S. Cl.
CPC ........ *G06F 3/0486* (2013.01); *G06F 3/04845* (2013.01); *G06F 16/168* (2019.01); *G06F 16/9558* (2019.01)

(58) Field of Classification Search
CPC .. G06F 3/0486; G06F 3/04845; G06F 16/168; G06F 16/9558
See application file for complete search history.

(56) References Cited

U.S. PATENT DOCUMENTS

| | | | |
|---|---|---|---|
| 10,162,491 B2 | 12/2018 | Urbach | |
| 2002/0062321 A1* | 5/2002 | Shibata | G06Q 10/107 |
| 2006/0053384 A1* | 3/2006 | La Fetra | G06F 3/048 |
| | | | 715/765 |
| 2007/0100865 A1* | 5/2007 | King | G06F 16/345 |
| 2007/0276837 A1* | 11/2007 | Bodin | G06F 16/9535 |
| 2010/0175011 A1 | 7/2010 | Song et al. | |
| 2013/0174070 A1 | 7/2013 | Briand | |
| 2018/0373544 A1* | 12/2018 | Deng | G06F 9/445 |
| 2019/0095803 A1* | 3/2019 | Raskovic | G06F 40/14 |
| 2019/0354349 A1* | 11/2019 | Gutierrez | G06Q 50/18 |
| 2020/0184154 A1 | 6/2020 | Hewitt et al. | |
| 2020/0192863 A1 | 6/2020 | Stratman | |

* cited by examiner

*Primary Examiner* — Daniel W Parcher
(74) *Attorney, Agent, or Firm* — Yee & Associates, P.C.

(57) ABSTRACT

Enabling drag and drop operations between disparate file formats is provided. An indication that a user dragged and dropped a source information item having a particular file format into a local application of a data processing system is received by an operating system of the data processing system. The local application utilizes a different file format from the particular file format of the source information item. Relevant content that corresponds to the local application is identified by the operating system in the source information item. The relevant content corresponding to the local application is extracted by the operating system from the source information item. The relevant content extracted from the source information item having the particular file format is incorporated by the operating system into the local application that utilizes the different file format from the particular file format of the source information item for use by the local application.

11 Claims, 5 Drawing Sheets

ARTIFICIAL INTELLIGENCE-BASED OPERATING SYSTEM FOR DRAG AND DROP OPERATIONS

BACKGROUND

1. Field

The disclosure relates generally to operating systems and more specifically to providing an artificial intelligence-based operating system that enables a drag and drop operation between a source file utilizing one type of file format and a target local application utilizing another type of file format in a data processing system.

2. Description of the Related Art

An operating system is program that manages resources, such as, hardware, applications, common services, and the like, of a data processing system. For hardware functions, the operating system acts as an intermediary between applications and the hardware. Operating systems are found on many different types of data processing systems, such as, for example, any type of computer, mobile phone, gaming system, and the like. A single-tasking operating system only runs one application at a time. In contrast, a multi-tasking operating system allows more than one application to be running concurrently. This concurrency is achieved by time sharing, where the operating system divides available processor time between multiple applications.

SUMMARY

According to one illustrative embodiment, a method for enabling drag and drop operations between disparate file formats is provided. An operating system of a data processing system receives an indication that a user dragged and dropped a source information item having a particular file format into a local application of the data processing system. The local application utilizes a different file format from the particular file format of the source information item. The operating system identifies relevant content that corresponds to the local application in the source information item. The operating system extracts the relevant content corresponding to the local application from the source information item. The operating system incorporates the relevant content extracted from the source information item having the particular file format into the local application that utilizes the different file format from the particular file format of the source information item for use by the local application. According to other illustrative embodiments, a computer system and computer program product for enabling drag and drop operations between disparate file formats are provided.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
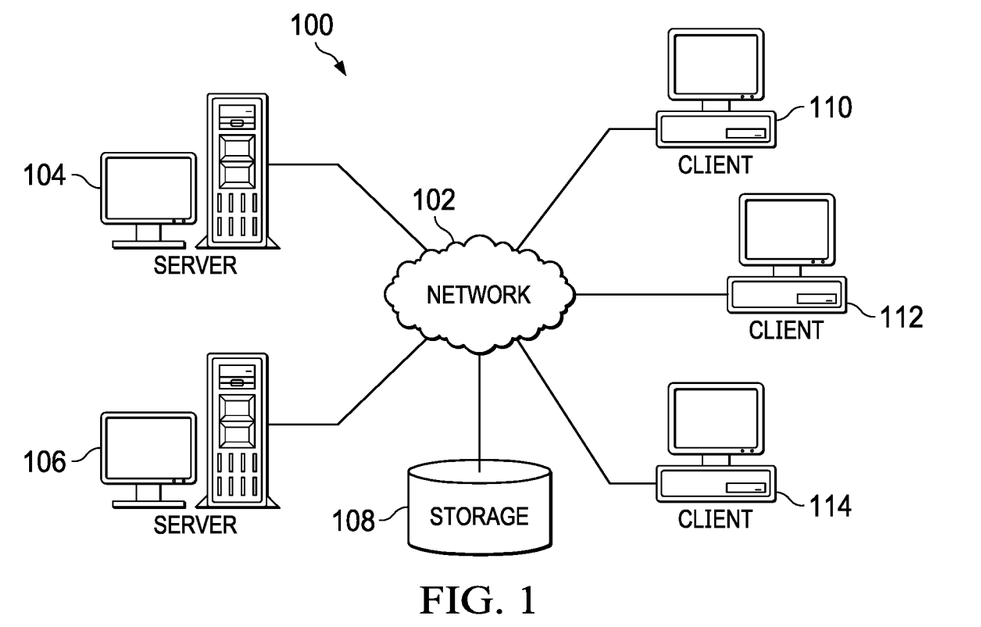
FIG. 1 is a pictorial representation of a network of data processing systems in which illustrative embodiments may be implemented.
Figure 2:
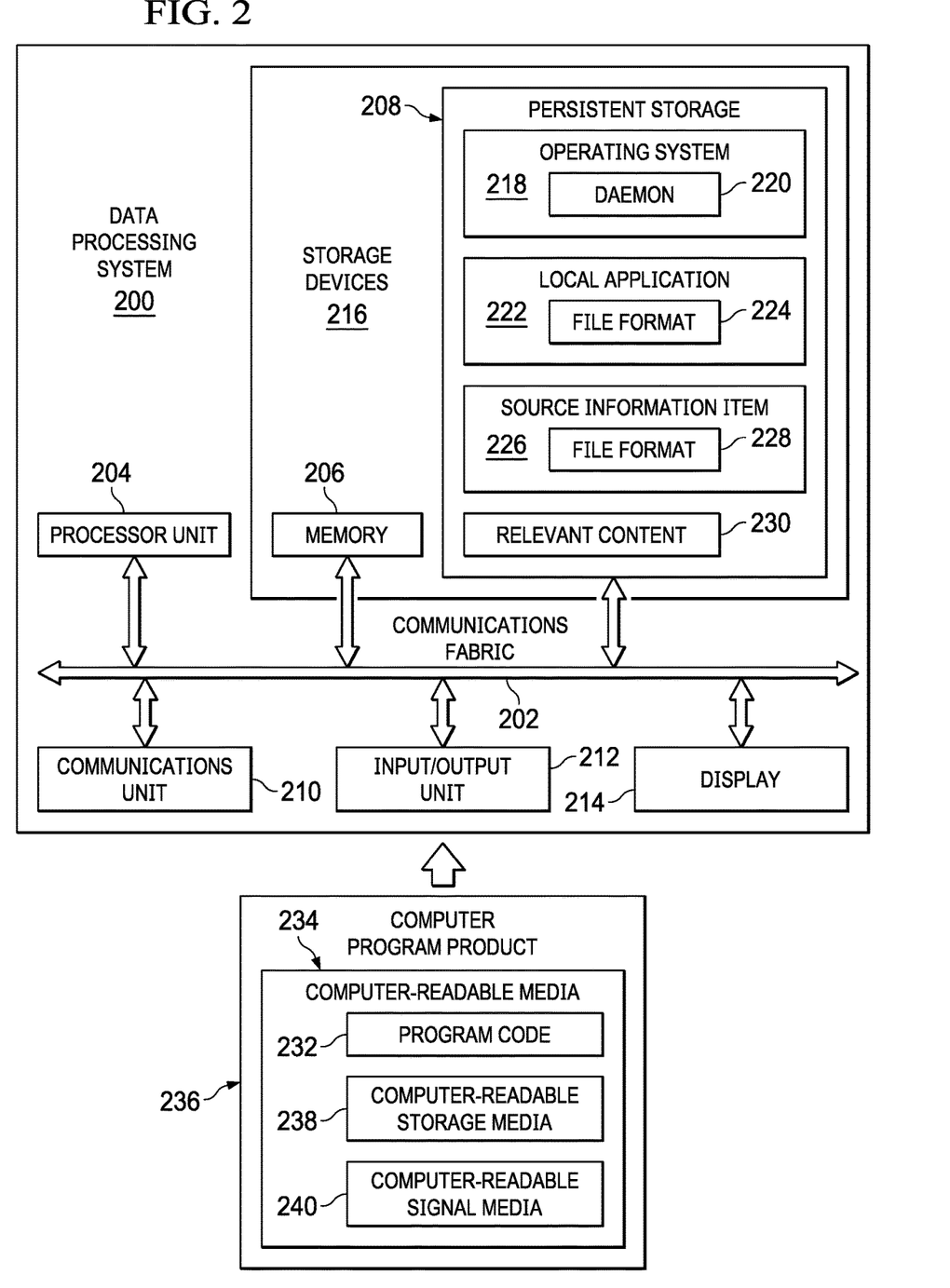
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 may provide information services to client devices. The type of information provided by server 104 and server 106 may be any type of information, such as, for example, coding information, video information, educational information, textual information, and the like. In addition, server 104 and server 106 may provide the information in different types of file formats. Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart vehicles, gaming devices, and the like, with wire or wireless communication links to network 102.

In addition, each of clients 110, 112, and 114 include an artificial intelligence-based operating system of illustrative embodiments that enables drag and drop operations from source information items, such as, for example, single source files, composite source files, webpages, and the like, which utilize various types of file formats, into target local applications that utilize file formats different from the file formats utilized by the source information items. An artificial intelligence-based operating system has features related to application management, hardware management, and common system services management. However, a differentiator from a classical operating system is the intelligence exhibited by the artificial intelligence-based operating system in the management of a data processing system, such as client 110, client 112, and client 114. The artificial intelligence operating system utilizes one or more artificial intelligence-based methods. For example, the artificial intelligence operating system may utilize at least one of machine learning, natural language processing, fuzzy logic, expert system, neural network, pattern recognition, prediction, and the like to improve the management and functioning of client 110, client 112, and client 114 over time.

The artificial intelligence-based operating system of illustrative embodiments identifies and extracts relevant content corresponding to a target local application from a source information item and incorporates that extracted content into the target local application for use by the target local application even though the extracted content was previously in a file format unusable by the target local application. Users of clients 110, 112, and 114 may utilize clients 110, 112, and 114 to access, drag, and drop information provided by server 104 and server 106 into target local applications loaded on clients 110, 112, and 114.

Storage 108 is a network storage device capable of storing any type of information in a structured format or an unstructured format. In addition, storage 108 may represent a plurality of network storage devices. Further, users of clients 110, 112, and 114 may access, drag, and drop information stored in storage 108 into target local applications on clients 110, 112, and 114.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 may be, for example, a computer, such as client 110 in FIG. 1, in which computer-readable program code or instructions implementing the drag and drop processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, or some combination of the above. The media used by persistent storage 208 may be removable. For example, a removable disk drive may be used for persistent storage 208.

In this example, persistent storage 208 stores operating system 218. However, it should be noted that even though operating system 218 is illustrated as residing in persistent storage 208, in an alternative illustrative embodiment, operating system 218 may be a separate component of data processing system 200. Operating system 218 is an artificial intelligence-based operating system. In addition, operating system 218 can include daemon 220. Daemon 220 is a process that runs in the background. Operating system 218 may utilize daemon 220 to control the drag and drop processes of illustrative embodiments.

Local application 222 represents any type of application, such as, for example, a code editor application, a media player application, or the like, loaded on data processing system 200 for use by a user of data processing system 200. In addition, local application 222 may represent a plurality of different local applications. Local application 222 utilizes content or data in file format 224. In other words, file format 224 represents a particular type of file format that is utilized by local application 222.

Source information item 226 represents a source of information or content, such as, for example, a single source file, a composite source file, a webpage, or the like, which is of relevance or interest to the user of data processing system 200. Source information item 226 may be located locally on data processing system 200 or located remotely and accessed by data processing system 200 via a network, such as, for example, network 102 in FIG. 1. The content of source information item 226 is in file format 228. In this example, file format 228 is different from file format 224. In other words, local application 222 cannot utilize information or content in file format 228.

In this example, the user of data processing system 200 drags and drops source information item 226 into local application 222. In other words, local application 222 is the target of the drag and drop operation. When daemon 220 receives an indication that the user of data processing system 200 dragged and dropped source information item 226 into local application 222, daemon 220 identifies both source information item 226 and local application 222. Then, daemon 220 scans and analyzes the content of source information item 226 utilizing, for example, natural language processing, and identifies relevant content 230 that corresponds to local application 222 using, for example, machine learning. For example, if local application 222 is a code editor application, then daemon 220 identifies relevant content 230 contained within source information item 226 that can be utilized by local application 222 even though the code in source information item 226 is in file format 228, which is different from file format 224 utilized by local application 222. It should be noted that daemon 220 ignores the other content within source information item 226 that is not relevant. After identifying relevant content 230, daemon 220 incorporates or copies relevant content 230 into local application 222 for use by local application 222. In other words, local application 222 can now process and utilize relevant content 230 even though relevant content 230 was previously in an unusable file format.

As a result, data processing system 200 operates as a special purpose computer system in which operating system 218 in data processing system 200 enables incorporation of extracted content from a source file utilizing one type of file format into a target local application utilizing another type of file format for use of the extracted content by the target local application. In particular, operating system 218 transforms data processing system 200 into a special purpose computer system as compared to currently available general computer systems that do not have operating system 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 232 is located in a functional form on computer-readable media 234 that is selectively removable and may be loaded onto or transferred to data processing system 200 for running by processor unit 204. Program code 232 and computer-readable media 234 form computer program product 236. In one example, computer-readable media 234 may be computer-readable storage media 238 or computer-readable signal media 240.

In these illustrative examples, computer-readable storage media 238 is a physical or tangible storage device used to store program code 232 rather than a medium that propagates or transmits program code 232. Computer-readable storage media 238 may include, for example, an optical or magnetic disc that is inserted or placed into a drive or other device that is part of persistent storage 208 for transfer onto a storage device, such as a hard drive, that is part of persistent storage 208. Computer-readable storage media 238 also may take the form of a persistent storage, such as a hard drive, a thumb drive, or a flash memory that is connected to data processing system 200.

Alternatively, program code 232 may be transferred to data processing system 200 using computer-readable signal media 240. Computer-readable signal media 240 may be, for example, a propagated data signal containing program code 232. For example, computer-readable signal media 240 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 234" can be singular or plural. For example, program code 232 can be located in computer-readable media 234 in the form of a single storage device or system. In another example, program code 232 can be located in computer-readable media 234 that is distributed in multiple data processing systems. In other words, some instructions in program code 232 can be located in one data processing system while other instructions in program code 232 can be located in one or more other data processing systems. For example, a portion of program code 232 can be located in computer-readable media 234 in a server computer while another portion of program code 232 can be located in computer-readable media 234 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 232.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Current operating systems are designed in such a way that a corresponding application works with a particular file format, which is identified using either a file extension or magic number. However, the application does not work with any other file format even if the other file format contains content that can be utilized by that particular application. For example, if a user drags and drops a hypertext markup language (HTML) file containing C program code into a local C program code editor application, the local C program code editor application will send an error message to the user indicating that the local C program code editor application cannot be open the HTML file because it is in an incorrect file format even when the HTML file contains C program code. Similarly, if a user drags and drops a video file into a local code editor application, the local code editor application will not be able to open the video file and will send an error message to the user indicating that the local code editor application cannot open the video file even though the video file may contain code that the local code editor application can utilize.

For the two examples above, if the user wants the content contained within the HTML file and video file, then the user will need to spend time manually copying the C program code content from the webpages, which includes the headers present in the different webpages, into the local C program code editor application and manually type the relevant code content contained within the video file into the local code editor application. Illustrative embodiments enhance operating systems by enabling a drag and drop operation of source information items, such as, for example, files, images, code, webpages, links, and the like, into target local applications that utilize different file formats. In other words, operating systems of illustrative embodiments utilize machine learning to perform integration between local applications and relevant content extracted from source information items. Using illustrative embodiments, an operating system is capable of extracting and organizing relevant content from, for example, a source file and feeding the extracted relevant content from the source file into a target local application. For example, when a user drags and drops a weblink corresponding to a video file from a social media website into a local video application of a data processing system corresponding to the user, the operating system of the user's data processing system using illustrative embodiments streams the video file into a video buffer of the data processing system so that the video file can be played by the local video application. In the example of the video file and code editor above, the operating system of illustrative embodiments copies relevant code contained within the video file into the local code editor application for use by the local code editor application.

Illustrative embodiments provide an operating system that does not depend on file extensions or magic numbers of files to work with target local applications. Operating systems of illustrative embodiments are artificial intelligence-based utilizing, for example, natural language processing, machine learning, and the like, to identify and extract relevant content (e.g., text, images, code, webpages, or the like), which corresponds to a target local application of the user's data processing system, from one or more source content information items and incorporate the extracted relevant content into the target local application for use by the target local application even though the source content information items may be in a different file format utilized by the target local application. As a result, operating systems of illustrative embodiments improve the performance of the user's data processing system, itself.

Further, operating systems of illustrative embodiments include a set of sub-services that is utilized based on the different types of target local applications. The set of sub-services is automatically enhanced using machine learning algorithms. For example, when a user drags and drops a video file from a social media website into a local media player application for playing, operating systems of illustrative embodiments may utilize a streaming sub-service to provide the necessary buffering of the video file from the website to the local media player application. Operating systems of illustrative embodiments utilize machine learning to automatically learn different streaming sub-services for different websites. In addition, if a particular local application requires a particular file format or requires data in particular chunks, then operating systems of illustrative embodiments will provide the particular file format or particular chunks of data to that particular target local application. As a result, illustrative embodiments enable web applications and local applications to interact with each other without any change in the web or local applications. For example, operating systems of illustrative embodiments integrate with all the local applications in the user's data processing system (e.g., computer) and perform any needed modifications in the local applications so the local applications can utilize the web content.

As another illustrative example, assume a user wants help writing a traversal program for a tree structure. If the user searches the Internet for helpful information, then the user will find a multitude of links corresponding to websites that can provide detailed information regarding explanations and solutions to writing a traversal program. Websites are currently available where the user can browse code for the traversal program and also execute the code directly in those websites. This means that one or more websites already have the code for the traversal program, along with header files and other declarations needed for the creation of the tree structure, insertion of data into the tree structure, and then traversal of the tree structure. However, if the user wants to execute the same traversal program locally in the user's data processing system, then the user has to manually perform the following steps: create a header file containing a template for the tree structure, create the tree structure, insert data into the tree structure, and then traverse the tree structure. Writing the code for the traversal program can be beneficial if the user is writing code for the first time to learn from the process. However, this process is time and effort intensive.

Illustrative embodiments provide a solution to the program writing problem above. For example, using an operating system of illustrative embodiments the user only has to drag and drop a particular webpage from the website containing the code for the traversal program into a target local application (i.e., local code editor application) of the user's data processing system. The operating system of illustrative embodiments then identifies the relevant content (i.e., the code for the traversal program in the webpage) and where (i.e., the target local code editor application) the user dragged and dropped the webpage. Based on identification of the code in the webpage and the target local code editor application where the webpage was dragged and dropped, the operating system of illustrative embodiments utilizes natural language processing and a machine learning algorithm to analyze the code, organize the code in the local code editor application in such a way that the code is easily compilable and then executable in the local code editor application.

As a further illustrative example, if the user is watching a traversal program video on a social media website and the user wants to see that same video played in a local application of the user's data processing system, then all the user has to do is drag and drop that particular video into the local application (i.e., local media player application). In this example, the operating system of illustrative embodiments identifies the uniform resource locator of the video and then starts streaming that particular video into the local media player application. If the user drags and drops the same traversal program video into the local code editor, then the operating system of illustrative embodiments extracts all the relevant code that is present in the traversal program video, analyzes the extracted code, creates a text file containing that code, and opens the text file containing that code in the local code editor application for use by the local code editor application.

As a still further example, if the user drags and drops a weblink corresponding to a particular webpage into a target local application of the user's data processing system, the operating system of illustrative embodiments scans and parses the webpage using, for example, natural language processing and machine learning, to identify the relevant content contained in that webpage based on the particular type of target local application. Based on identification of the relevant content corresponding to the particular type of target local application, the operating system of illustrative embodiments only extracts the relevant content from the webpage and disregards or ignores the rest of the content in the webpage. Thus, in the example of the local code editor application, the operating system of illustrative embodiments only extracts the code from the webpage that can be utilized by the local code editor application and copies the extracted code into the local code editor application for use by the local code editor application.

As an example of machine learning and cognitive analysis of illustrative embodiments, assume the user has a presentation document (e.g., powerpointdocument.ppt) that explains different types of structured query languages, such as create table, select statement, insert into, and the like. When the user drags and drops the presentation document into a target local database application that is connected to a remote database server, the operating system of illustrative embodiments scans, identifies, and extracts the relevant content (e.g., data definition language statements, data manipulation language statements, and the like) contained within the presentation document that can be executed in the remote database server. Then, the operating system of illustrative embodiments generates an executable structured query language file for the target local database application to execute in the remote database server based on the extracted relevant content. The user can utilize the generated structured query language file in the target local database application as input to the remote database server and test the user's commands (i.e., create table statements in structured query language), which the user learned from the presentation document.

As a still further example, a photoshop application generates files with a particular file extension (e.g., .psd). A particular type of data processing system generates a particular magic number to identify that same file. As a result, if the user drags and drops that particular file in the photoshop application loaded on different types of data processing systems, then the photoshop application would be able to open that particular file and present the edit screen to the user for editing that particular file (e.g., photograph). However, if the user drags and drops a composite file (e.g., zip file, tar file, or the like), which contains a plurality of different files in different file formats (e.g., a set of photoshop application files, a set of text files, a set of presentation documents, and the like), into the photoshop application, then the photoshop application will not be able to extract and open its own supported application file from the zip or tar file and will generate an error message indicating that the photoshop application cannot open the provided zip or tar file as it is not supported in the given platform. If the user only drags and drops a photoshop application file into the photoshop application, then the photoshop application can easily identify and open the file as a photoshop application file and provide an option to edit that file. However, this is not applicable when photoshop application files are included within a composite file containing several different file formats. If the user drags and drops that same composite file in a local photoshop application of the user's data processing system having an operating system of illustrative embodiments, then the operating system of illustrative embodiments identifies relevant content in each respective file of the composite file that can be applied to that local photoshop application, extracts only relevant content from those files that can be applied to that local photoshop application, and incorporates the extracted content into the local photoshop application for use and will ignore all other content in the composite file.

The operating system of illustrative embodiments may utilize, for example, a daemon or similar program. A daemon in a multitasking operating system is a program that runs as a background process rather than being under direct control of a user. The daemon of the operating system keeps running on the user's data processing system and tracks target local applications, along with the source information items (e.g., singular files, composite files, webpages, weblinks, and the like) dragged and dropped into the target local applications.

As a still further example, if the user drags and drops a composite file, which contains C program code within one or more files of the composite file, into a target local C program code editor application on the user's data processing system, then the daemon of the operating system automatically identifies each respective file contained in the composite source file, identifies relevant C program code content corresponding to the target local C program code editor application within one or more of the different files of the composite source file, extracts the relevant C program code content from the one or more different files, and copies the extracted relevant C program code content into the target local C program code editor application for use by the local C program code editor application. When the size of the composite source file is greater than a defined threshold size, then the daemon may display a message to the user indicating, for example, "Identifying relevant content, time to complete identification is approximately X seconds/minutes." In addition, if the composite source file contains relevant C program code content within multiple files of the composite source file, then the daemon may display a message to the user indicating, for example, which specific files contain the relevant C program code content and request the user to select which of the specific files (e.g., all or only certain files) to extract the relevant C program code content from.

As a still further example, assume a meeting regarding structured query language topics is currently being conducted. During the meeting, a presenter shows a new structured query language theory using a presentation document. The presentation document includes sample structured query language queries for better understanding. After viewing the sample queries during the meeting, a participant asks the presenter to run one of the sample queries in a structured query language database as a demonstration. Using illustrative embodiments, the presenter only needs to drag and drop the presentation document into a local structured query language editor application or command line interface. The daemon of the operating system analyzes all the information in the presentation document, identifies the relevant content corresponding to the sample queries based on, for example, keywords and syntax using natural language processing and machine learning, extracts the relevant content, and copies the relevant content, which complies with the format of the local structured query language editor application or command line interface, into the local structured query language editor application or command line interface. The daemon may save the relevant content in a script file and prompt user to run the script file in the local structured query language editor application or command line interface. Alternatively, the daemon may automatically run the relevant structured query language content in the local structured query language editor application or command line interface.

Thus, illustrative embodiments provide one or more technical solutions that overcome a technical problem with incorporating relevant content extracted from a source information item that utilizes one type of file format into a local application that utilizes content in another type of file format for use by that local application. As a result, these one or more technical solutions provide a technical effect and practical application in the field of operating systems.

Figure 3:
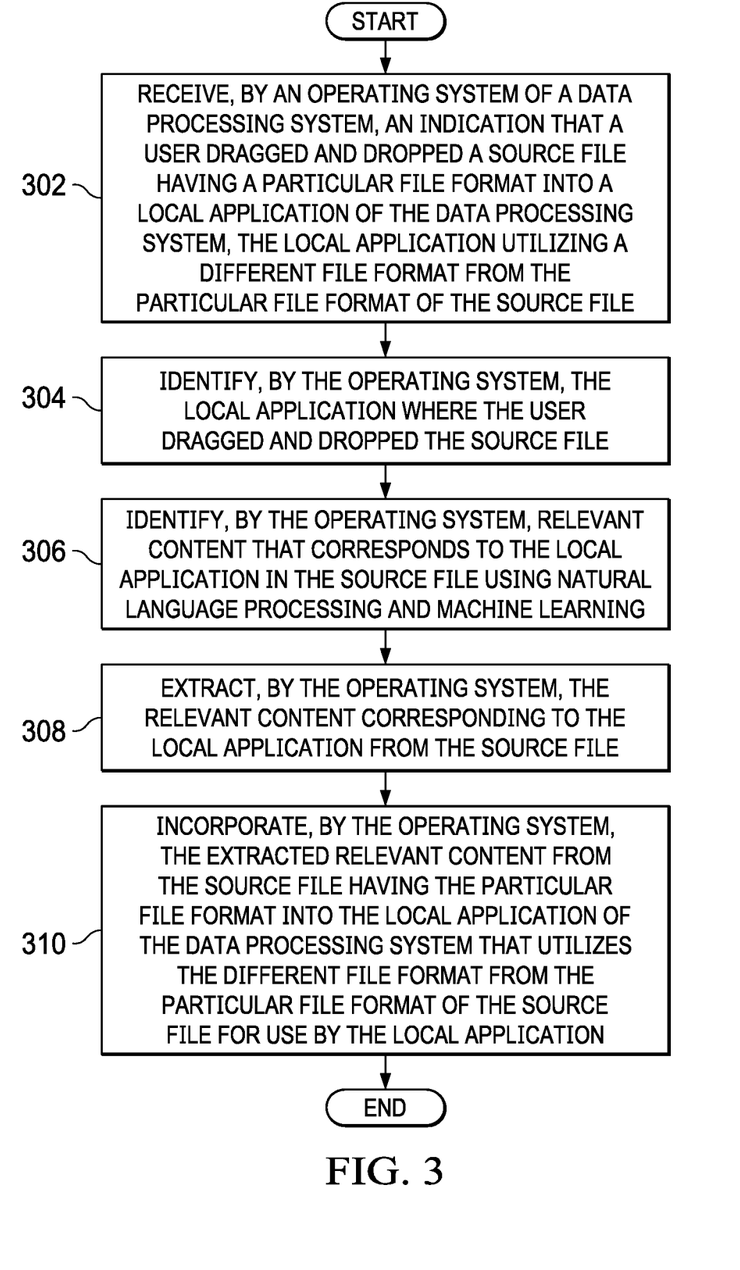
FIG. 3 is a flowchart illustrating a process for incorporating relevant content from a single source file into a local application in accordance with an illustrative embodiment.

With reference now to FIG. 3, a flowchart illustrating a process for incorporating relevant content from a single source file into a local application of a data processing system is shown in accordance with an illustrative embodiment. The process shown in FIG. 3 may be implemented in a data processing system, such as, for example, client 110 in FIG. 1 or data processing system 200 in FIG. 2. For example, the process shown in FIG. 3 may be implemented in operating system 218 in FIG. 2.

The process begins when the operating system of the data processing system receives an indication that a user dragged and dropped a source file having a particular file format into a local application of the data processing system (step 302). The local application utilizes a different file format from the particular file format of the source file. In addition, the operating system of the data processing system identifies the local application where the user dragged and dropped the source file (step 304).

Further, the operating system of the data processing system identifies relevant content that corresponds to the local application in the source file using natural language processing and machine learning (step 306). Furthermore, the operating system of the data processing system extracts the relevant content corresponding to the local application from the source file (step 308). Moreover, the operating system of the data processing system incorporates the extracted relevant content from the source file having the particular file format into the local application of the data processing system that utilizes a different file format from the particular file format of the source file for use by the local application (step 310). Thereafter, the process terminates.

Figure 4:
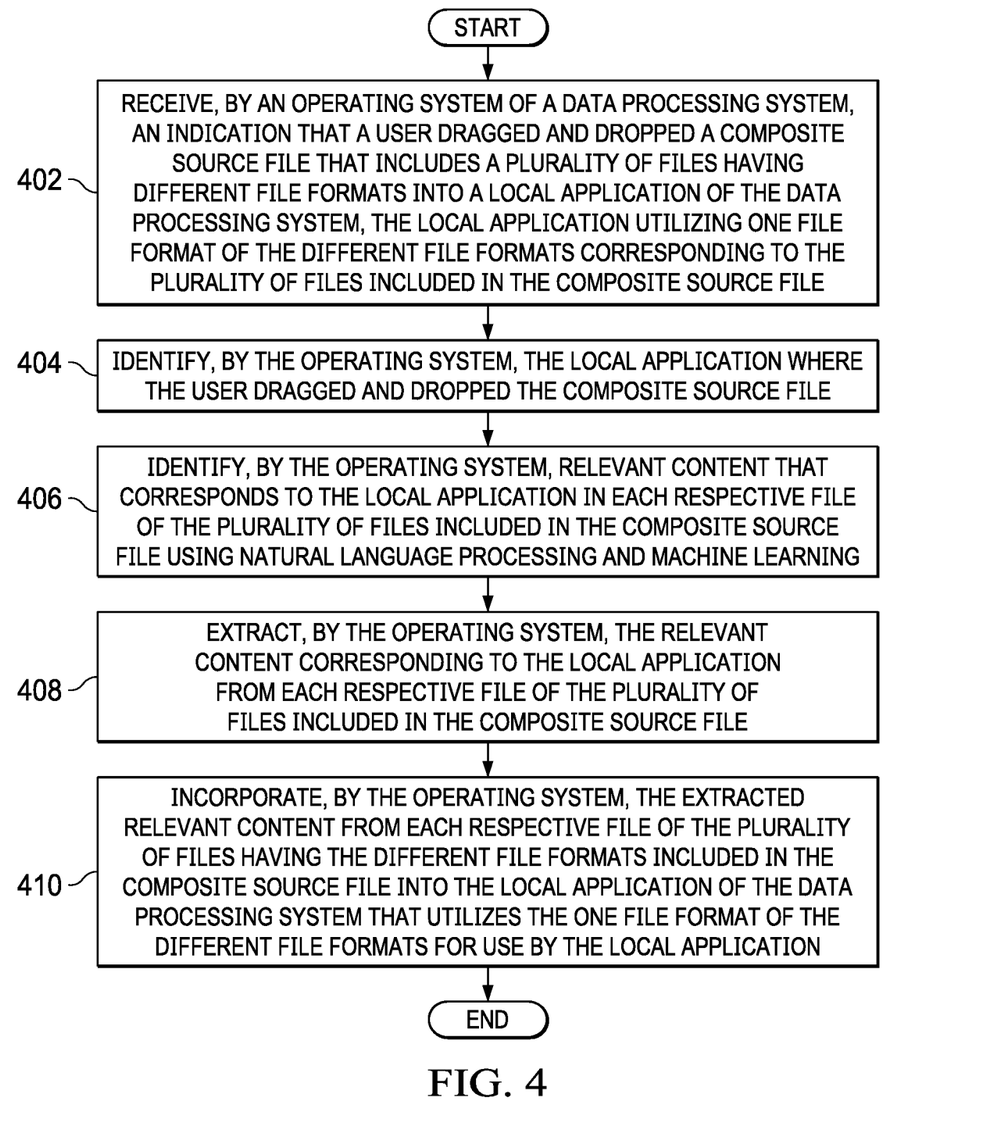
FIG. 4 is a flowchart illustrating a process for incorporating relevant content from a composite source file into a local application in accordance with an illustrative embodiment.

With reference now to FIG. 4, a flowchart illustrating a process for incorporating relevant content from a composite source file into a local application of a data processing system is shown in accordance with an illustrative embodiment. The process shown in FIG. 4 may be implemented in a data processing system, such as, for example, client 110 in FIG. 1 or data processing system 200 in FIG. 2. For example, the process shown in FIG. 4 may be implemented in operating system 218 in FIG. 2.

The process begins when the operating system of the data processing system receives an indication that a user dragged and dropped a composite source file that includes a plurality of files having different file formats into a local application of the data processing system (step 402). The local application utilizes one file format of the different file formats corresponding to the plurality of files included in the composite source file. The composite source file may be, for example, a zip file, a tar file, or the like.

In addition, the operating system of the data processing system identifies the local application where the user dragged and dropped the source composite file (step 404). Further, the operating system of the data processing system identifies relevant content that corresponds to the local application in each respective file of the plurality of files included in the source composite file using natural language processing and machine learning (step 406). Furthermore, the operating system of the data processing system extracts the relevant content corresponding to the local application from each respective file of the plurality of files included in the source composite file (step 408). Moreover, the operating system incorporates the extracted relevant content from each respective file of the plurality of files having the different file formats included in the source composite file into the local application of the data processing system that utilizes the one file format of the different file formats for use by the local application (step 410). Thereafter, the process terminates.

Figure 5:
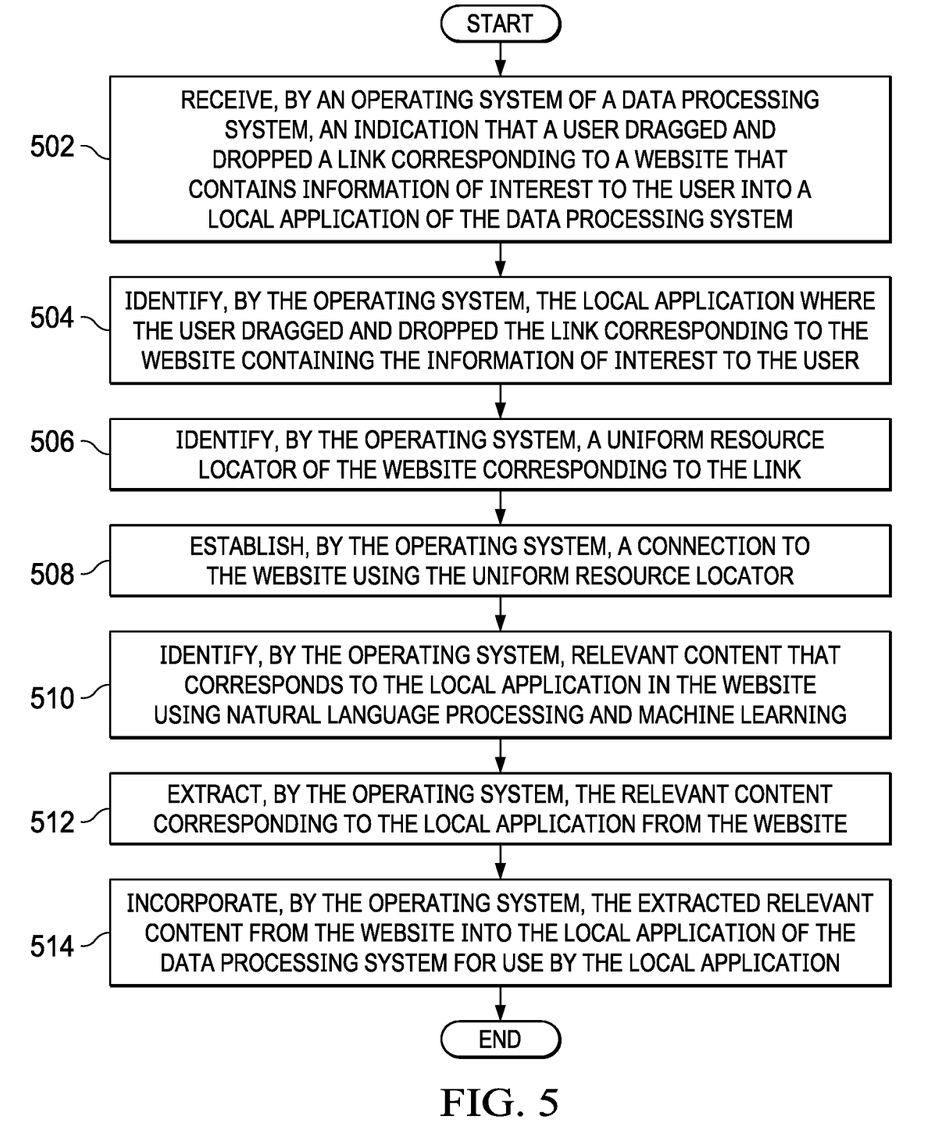
FIG. 5 is a flowchart illustrating a process for incorporating relevant content from a website into a local application in accordance with an illustrative embodiment.

With reference now to FIG. 5, a flowchart illustrating a process for incorporating relevant content from a website into a local application of a data processing system is shown in accordance with an illustrative embodiment. The process shown in FIG. 5 may be implemented in a data processing system, such as, for example, client 110 in FIG. 1 or data processing system 200 in FIG. 2. For example, the process shown in FIG. 5 may be implemented in operating system 218 in FIG. 2.

The process begins when the operating system of the data processing system receives an indication that a user dragged and dropped a link corresponding to a website that contains information of interest to the user into a local application of the data processing system (step 502). In addition, the operating system of the data processing system identifies the local application where the user dragged and dropped the link corresponding to the website containing the information of interest to the user (step 504). Further, the operating system of the data processing system identifies a uniform resource locator of the website corresponding to the link (step 506).

Afterward, the operating system of the data processing system establishes a connection to the website using the uniform resource locator (step 508). The operating system of the data processing system identifies relevant content that corresponds to the local application contained within the website using natural language processing and machine learning (step 510). The operating system of the data processing system extracts the relevant content corresponding to the local application from the website (step 512). The operating system of the data processing system then incorporates the extracted relevant content from the website into the local application of the data processing system for use by the local application (step 514). Thereafter, the process terminates.

Thus, illustrative embodiments of the present invention provide a computer-implemented method, computer system, and computer program product for providing an artificial intelligence-based operating system that enables a drag and drop operation between a source file utilizing one type of file format and a target local application utilizing another type of file format in a data processing system. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enabling drag and drop operations between disparate file formats, the method comprising:
   receiving, by an operating system of a data processing system, an indication that a user dragged and dropped a composite source file that includes a plurality of files having different file formats into a local application of the data processing system, wherein the local application utilizes one file format of the different file formats corresponding to the plurality of files included in the composite source file;
   responsive to the operating system receiving the indication that the user dragged and dropped the composite source file that includes the plurality of files having the different file formats into the local application of the data processing system:
      scanning, by the operating system, content of each respective file of the plurality of files having the different file formats included in the composite source file;
      identifying, by the operating system, a particular portion of content that can be utilized by the local application in each respective file of the plurality of files having the different file formats included in the composite source file based on the scanning of the content of each respective file;
      extracting, by the operating system, only the particular portion of content that can be utilized by the local application from each respective file of the plurality of files having the different file formats included in the composite source file while ignoring remaining portions of content in the plurality of files that cannot be utilized by the local application; and
      incorporating, by the operating system, only the particular portion of content that can be utilized by the local application extracted from each respective file of the plurality of files having the different file formats included in the composite source file into the local application that utilizes the one file format of the different file formats for use by the local application; and
   responsive to the operating system receiving an indication that the user dragged and dropped the composite source file into a second local application that utilizes a second file format of the different file formats corresponding to the plurality of files included in the composite source file, extracting, by the operating system, a second particular portion of content that can be utilized by the second local application from each respective file of the plurality of files having the different file formats included in the composite source file while ignoring remaining portions of content in the plurality of files that cannot be utilized by the second local application.

2. The method of claim 1, wherein a source information item is a link corresponding to a website.

3. The method of claim 2 further comprising:
   receiving, by the operating system, an indication that the user dragged and dropped the link corresponding to the website that contains information of interest to the user into the local application;
   identifying, by the operating system, a uniform resource locator of the website corresponding to the link;
   establishing, by the operating system, a connection to the website using the uniform resource locator;
   identifying, by the operating system, the content that corresponds to the local application contained within the website;
   extracting, by the operating system, the content corresponding to the local application from the website; and
   incorporating, by the operating system, the content extracted from the website into the local application of the data processing system for use by the local application.

4. The method of claim 3, wherein the operating system is an artificial intelligence-based operating system.

5. The method of claim 4, wherein the operating system includes a set of sub-services that is utilized based on type of target local applications, and wherein the set of sub-services is automatically enhanced using machine learning, and wherein the machine learning automatically learns different streaming sub-services for different websites.

6. A data processing system for enabling drag and drop operations between disparate file formats, the data processing system comprising:
   a bus system;
   a storage device connected to the bus system, wherein the storage device stores program instructions; and
   a processor connected to the bus system, wherein the processor executes the program instructions to:
      receive, by an operating system of the data processing system, an indication that a user dragged and dropped a composite source file that includes a plurality of files having different file formats into a local application of the data processing system, wherein the local application utilizes one file format of the different file formats corresponding to the plurality of files included in the composite source file;
      in response to the operating system receiving the indication that the user dragged and dropped the composite source file that includes the plurality of files having the different file formats into the local application of the data processing system, the processor further executes the program instructions to:

scan, by the operating system, content of each respective file of the plurality of files having the different file formats included in the composite source file;

identify, by the operating system, a particular portion of content that can be utilized by the local application in each respective file of the plurality of files having the different file formats included in the composite source file based on the scan of the content of each respective file;

extract, by the operating system, only the particular portion of content that can be utilized by the local application from each respective file of the plurality of files having the different file formats included in the composite source file while ignoring remaining portions of content in the plurality of files that cannot be utilized by the local application; and incorporate, by the operating system, only the particular portion of content that can be utilized by the local application extracted from each respective file of the plurality of files having the different file formats included in the composite source file into the local application that utilizes the one file format of the different file formats for use by the local application; and in response to the operating system receiving an indication that the user dragged and dropped the composite source file into a second local application that utilizes a second file format of the different file formats corresponding to the plurality of files included in the composite source file, the processor further executes the program instructions to:

extract, by the operating system, a second particular portion of content that can be utilized by the second local application from each respective file of the plurality of files having the different file formats included in the composite source file while ignoring remaining portions of content in the plurality of files that cannot be utilized by the second local application.

7. The data processing system of claim 6, wherein a source information item is a link corresponding to a website.

8. The data processing system of claim 7 further comprising:

receive, by the operating system, an indication that the user dragged and dropped the link corresponding to the website that contains information of interest to the user into the local application;

identify, by the operating system, a uniform resource locator of the website corresponding to the link;

establish, by the operating system, a connection to the website using the uniform resource locator;

identify, by the operating system, the content that corresponds to the local application contained within the website;

extract, by the operating system, the content corresponding to the local application from the website; and incorporate, by the operating system, the content extracted from the website into the local application of the data processing system for use by the local application.

9. A computer program product for enabling drag and drop operations between disparate file formats, the computer program product comprising a computer-readable storage medium having program instructions embodied therewith, the program instructions executable by a data processing system to cause the data processing system to perform a method of:

receiving, by an operating system of the data processing system, an indication that a user dragged and dropped a composite source file that includes a plurality of files having different file formats into a local application of the data processing system, wherein the local application utilizes one file format of the different file formats corresponding to the plurality of files included in the composite source file;

responsive to the operating system receiving the indication that the user dragged and dropped the composite source file that includes the plurality of files having the different file formats into the local application of the data processing system:

scanning, by the operating system, content of each respective file of the plurality of files having the different file formats included in the composite source file;

identifying, by the operating system, a particular portion of content that can be utilized by the local application in each respective file of the plurality of files having the different file formats included in the composite source file based on the scanning of the content of each respective file;

extracting, by the operating system, only the particular portion of content that can be utilized by the local application from each respective file of the plurality of files having the different file formats included in the composite source file while ignoring remaining portions of content in the plurality of files that cannot be utilized by the local application; and incorporating, by the operating system, only the particular portion of content that can be utilized by the local application extracted from each respective file of the plurality of files having the different file formats included in the composite source file into the local application that utilizes the one file format of the different file formats for use by the local application; and responsive to the operating system receiving an indication that the user dragged and dropped the composite source file into a second local application that utilizes a second file format of the different file formats corresponding to the plurality of files included in the composite source file, extracting, by the operating system, a second particular portion of content that can be utilized by the second local application from each respective file of the plurality of files having the different file formats included in the composite source file while ignoring remaining portions of content in the plurality of files that cannot be utilized by the second local application.

10. The computer program product of claim 9, wherein a source information item is a link corresponding to a website.

11. The computer program product of claim 10 further comprising:

receiving, by the operating system, an indication that the user dragged and dropped the link corresponding to the website that contains information of interest to the user into the local application;

identifying, by the operating system, a uniform resource locator of the website corresponding to the link;

establishing, by the operating system, a connection to the website using the uniform resource locator;

identifying, by the operating system, the content that corresponds to the local application contained within the website;

extracting, by the operating system, the content corresponding to the local application from the website; and incorporating, by the operating system, the content extracted from the website into the local application of the data processing system for use by the local application.

* * * * *